Figure 1:
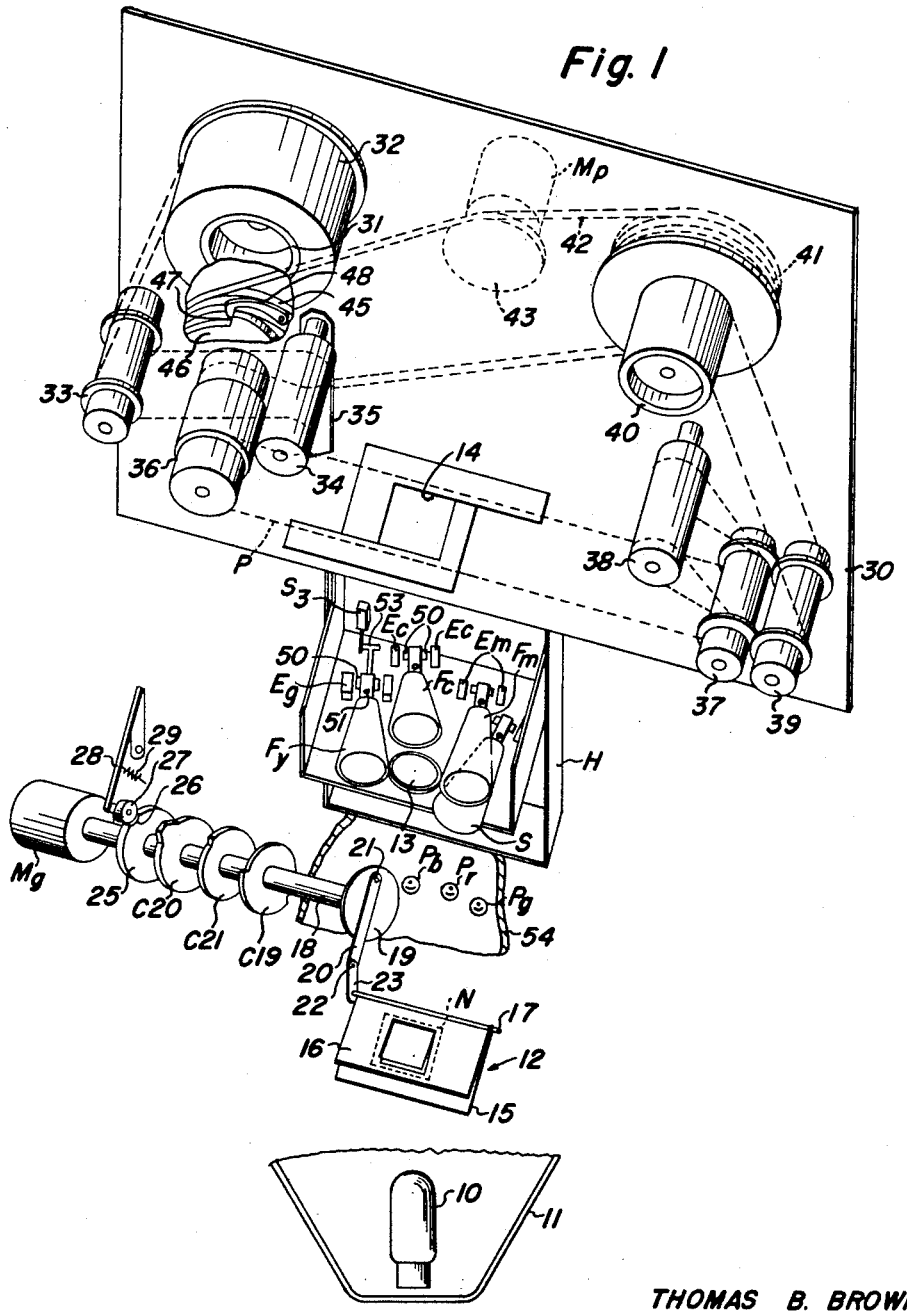

Nov. 6, 1962     T. B. BROWN     3,062,096
APPARATUS FOR MAKING COLOR PRINTS
Filed Feb. 26, 1960     3 Sheets—Sheet 1

THOMAS B. BROWN
INVENTOR.

BY R. Frank Smith

ATTORNEYS

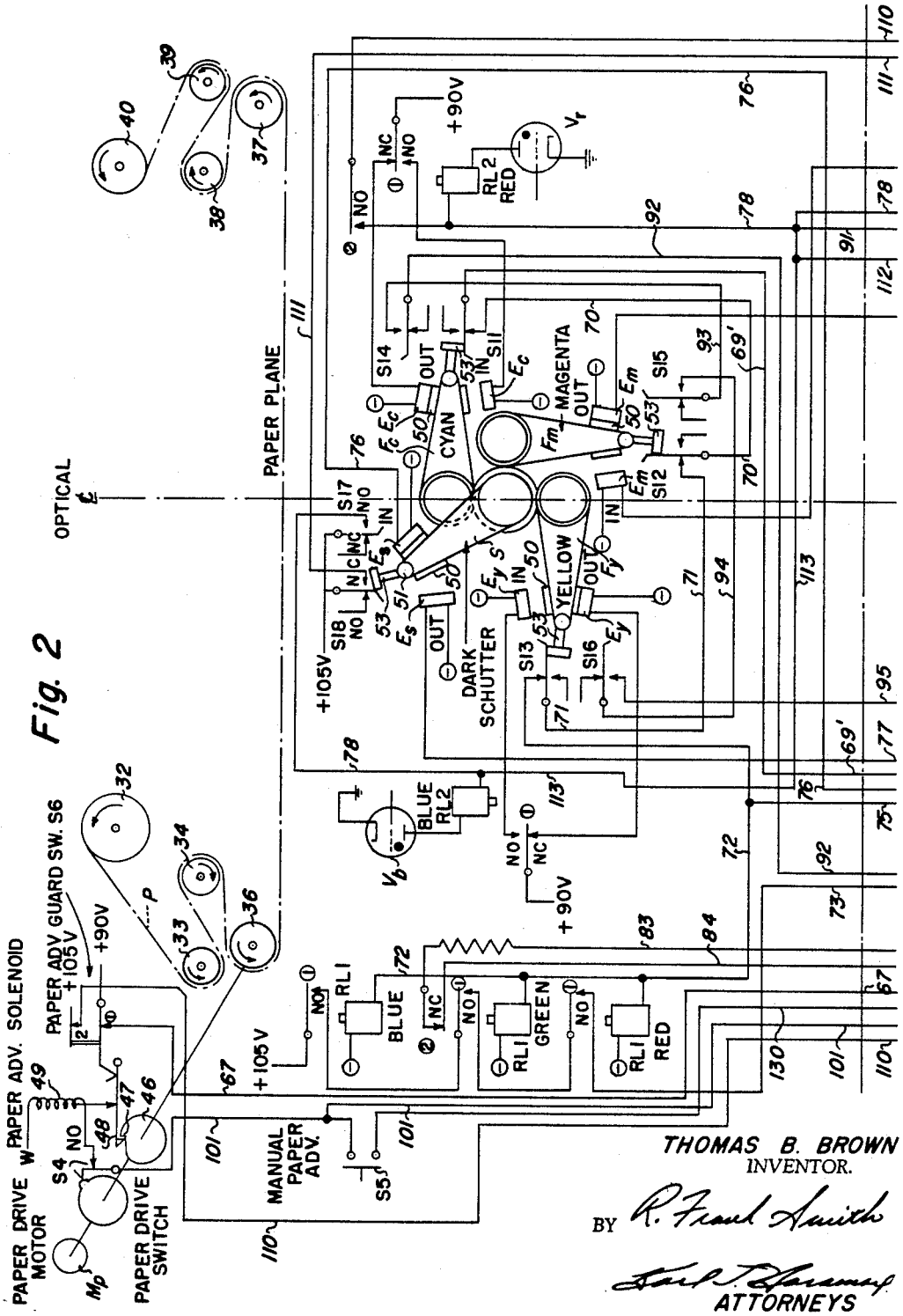

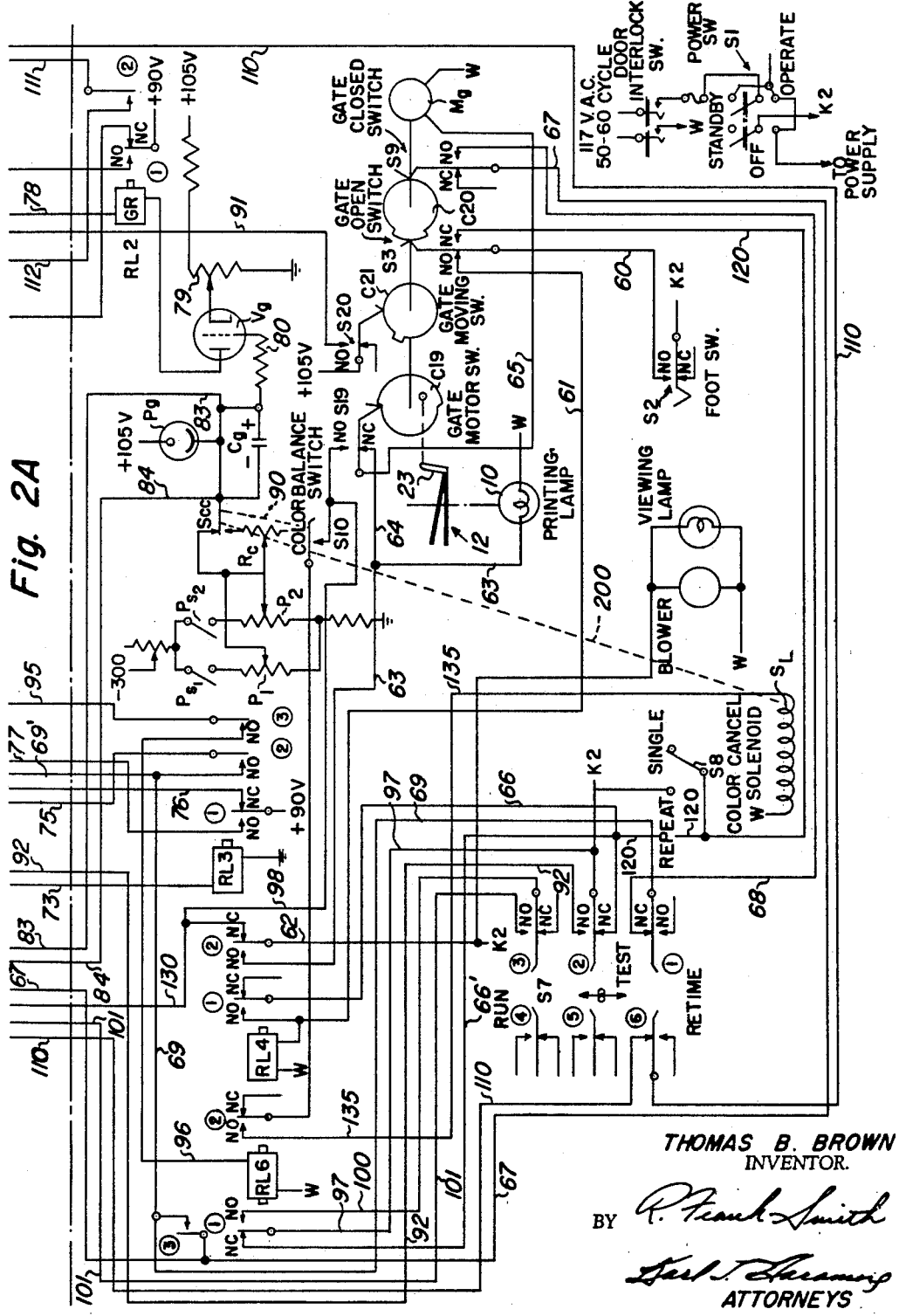

United States Patent Office 3,062,096
Patented Nov. 6, 1962

3,062,096
APPARATUS FOR MAKING COLOR PRINTS
Thomas B. Brown, Rochester, N.Y., assignor to Eastman Kodak Company, Rochester, N.Y., a corporation of New Jersey
Filed Feb. 26, 1960, Ser. No. 11,264
7 Claims. (Cl. 88—24)

The present invention relates to photographic color printers of the automatic type for printing color pictures on successive sections of a flexible strip of color print material, and particularly to improvements in the sequence control circuitry thereof.

The color printer to which the present invention relates is designed for making color prints from color negatives on a color print material using the subtractive principle, i.e., the exposure is started by directing a white light source (one containing each of the primary colors red, green and blue) through the color negative and onto the printing paper, and then as the proper exposure level is reached in each of the primary colors, a subtractive primary color filter is inserted into the printing beam which subtracts that color from the light striking the paper. The exposure is preferably based on the constant intensity, variable time principle, the exposure of each color being controlled by three integrator timers using the principle of charging a capacitor to a given value which triggers a thyratron to cause a solenoid to move a subtractive filter into the printing beam. The light integrating element in each timer is one or more phototubes equipped with proper filters (red, green or blue) and which measthe amount of each color light which is transmitted by the negative. For adjusting the exposure level in accordance with film type, negative subject classification, color correction for abnormal color balance in the negative, size compensation, etc., exposure control buttons are provided which when depressed will connect a suitable potentiometer and/or resistance into the timer circuit to adjust the exposure time to correct for the noted factor.

The negative to be printed is positioned in a gate which is motor driven between an open loading position and a closed printing position. The printing paper is adapted to be moved across the printing plane from a supply roll to a take-up roll by a feed mechanism which is adapted to move a predetermined length of the paper to and from the printing position in the printing plane at the end of each exposure.

The primary object of the present invention is to provide an improved automatic color printer of the type described which comprises a novel combination of parts which requires the minimum of thought and action on the part of the operator and will function only when certain actions have been taken by the operator.

And another object of the invention is to provide an automatic printer of the type described in which the several parts are interconnected by a novel control circuit which insures that the several parts operate in the proper sequence to make a print and will lock up when certain steps required of the operator are not properly performed. For example, the control circuit includes a supervisory circuit for detecting the improper position of the exposure control switches which are selectively operated by the operator and locks up the printer when these exposure control switches are not operated and will maintain the printer locked up until the switches are properly reset after an exposure.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which:

FIG. 1 is a diagrammatic view in perspective showing the combination of mechanical parts making up a projection type color printer constructed in accordance with a preferred embodiment of the present invention.

FIGS. 2 and 2A combined show the electrical control circuit for the combination of printer parts shown in FIG. 1. When FIGS. 2 and 2A are joined edgewise and right side up the essential mechanical elements of the printer are shown in their proper relative positions along the optical axis and the electrical control circuits in the two figures will be properly joined to show the complete control circuit interconnecting these mechanical elements.

Referring now to FIG. 1 a color printer constructed in accordance with a preferred embodiment of the present invention is shown as including a "white" light source (one containing red, green and blue light) in the form of an incandescent lamp 10 mounted in a suitable reflector 11, a negative gate 12 in which a color negative N is adapted to be positioned, a projection lens 13 and a printing aperture 14 which may be adjusted in size, is shown located in the focal plane of the projection lens, and across which a continuous strip of color sensitive printing paper P may be intermittently advanced for exposure. The path of the printing paper is shown in broken lines so as not to obscure the advancing mechanism therefor which will be described hereinafter. As is well known, each of these elements is in proper optical alignment so that an enlarged image of a color negative N placed in the negative carrier 12 will be projected onto the area of printing paper exposed by the printing aperture 14.

The negative gate 12 is one of the type which can be opened to permit the insertion or removal of a negative for printing purposes, and when closed holds the negative flat transversely of the optical axis of the printer for exposure purposes. To this end the negative gate 12 comprises a fixed frame member 15 extending transversely of the optical axis of the printer and a movable frame member 16 fixed to an oscillatable rod 17 extending parallel to one edge of the fixed frame. This rod is oscillated between a gate open position, shown in FIG. 1, and a gate closed position by a gate motor $M_g$ on the shaft 18 of which there is fixed a disk 19 to which a crank 20 is eccentrically mounted at one end 21 and is pivotally mounted at the other end 22 to a link 23 fixed to, and extending from, one end of the rod 17. One revolution of the gate motor $M_g$ serves to drive the gate from its open position to a closed position and back to an open position so that only a half revolution of the motor is required to drive the gate closed from an open position (the motion required to start an exposure) and the other half revolution is used to reopen the gate for reloading purposes. Fixed to the gate motor shaft 18 are cams C19, C20 and C21, which operate switches in the control circuit, as will be hereinafter described, to effect proper sequencing of the printer operation. The motor shaft also has fixed thereto a disk 25 having diametrically opposed arcuate recesses 26 into which a roller 27 on the end of a pivoted arm 28 loaded by a spring 29 drops to stop the motor shaft 18 in either its gate open or gate closed positions. As will be fully set forth hereinafter, the gate motor $M_g$ is de-energized just before the gate reaches either its fully open or fully closed position and is allowed to coast to these positions. It is during this coasting period that the engagement of roller 27 with one of the recesses 26 in disk 25 accurately stops the shaft 18 with the gate fully opened or fully closed as the case may be. In this manner the gate is accurately stopped in one or the other of its two positions without having to resort to an elaborate braking system for the gate motor or other costly schemes for accomplishing this desired result.

The printing paper P may be intermittently advanced across the printing aperture 14 by any suitable and well known means and to this end I have shown a paper feeding and metering means substantially of the type disclosed in U.S. Patent 2,541,013, Clutz, February 18, 1951. It is shown as comprising a vertical mechanism plate 30 on the front face of which a supply spindle 31 is rotatably mounted to receive a supply roll 32 of light sensitive paper P. From the supply roll the web of paper passes downwardly over a flanged guide roll 33, thence over a tensioning roll 34 carried on a spring loaded pivoted arm 35, and back over a rubber covered metering roll 36. After passing about the metering roll with a substantially 180° wrap, the web of paper moves horizontally across the printing aperture 14, around a first flanged guide roll 37, back over another tensioning roll 38, which may be carried by a pivotally mounted and spring loaded arm not shown, then downwardly over a second flanged guide roll 39 and finally onto a take-up spindle 40. The take-up reel is given a tendency drive through a conventional slip clutch, designated as 41 and located at the rear of plate 30, the driving member of which is continuously driven through a chain or belt 42 engaging a sprocket or pulley 43 driven by a motor Mp. For intermittently feeding measured lengths of paper across the printer aperture 14 the metering roll 36 is driven through a slip clutch arrangement the driving member 45 of which is constantly driven by chain or belt 42 and the driven member 46 of which is directly connected to the metering roll and includes a ratchet tooth 47 adapted to be engaged by a pivoted pawl 48 for the purpose of holding it stationary. When the pawl 48 is lifted by energization of a paper advance solenoid 49, see FIG. 2, the driven member 46 is freed and the metering roll 36 advances a given length of paper. When the ratchet tooth is freed the metering roll starts to move and when the solenoid 49 is deenergized the pawl 48 then drops down on the smooth periphery of the driven member 46 and the driven member continues to rotate until the pawl again engages the ratchet tooth thereon. If only one ratchet tooth 47 is on the driven member 46 as shown, then it is obvious that only one length of paper can be fed at each actuation of the paper advance solenoid. However, if different lengths of paper feed are desired, a full ratchet with a composite masking cam can be attached to driven member 46 as fully disclosed in the above noted Patent 2,541,013.

The space between exposure aperture 14 and the projection lens 13 is enclosed by a housing H in which are pivotally mounted three subtractive primary filters (a yellow filter $F_y$, a cyan filter $F_c$ and a magenta filter $F_m$) as well as a dark shutter S all adapted to move between an "out" position in which they are each removed from the printing light beam passing through the negative, and an "in" position wherein they are interposed into the light beam passing from the negative and through the lens 13 and onto the printing paper P located at the exposure aperture 14. Each of the subtractive primary filters and the dark shutter are moved between their two positions by the sequential energization of an "in" and "out" electromagnets $E_y$, $E_c$, $E_m$ and $E_s$ cooperating with magnetic plates 50 carried by opposite sides of the filter and dark shutter members adjacent the pivot points 51 thereof. It will thus be understood that when the "in" electromagnet of any filter or the shutter is energized while at the same time its "out" magnet is de-energized that the filter or shutter will be moved into the printing beam and vice versa. To insure the filters moving readily between their two positions when one of their driving magnets is energized and the other is de-energized a well known spring arrangement, not shown, may be incorporated with each filter and with the dark shutter which will be put under tension when the filters or shutter is moved to either of its positions and will act to kick the filter or shutter toward its other position when its energized holding magnet is de-energized. Looking at FIG. 2 in particular it will be noticed that each of the filters and the dark shutter has a tail portion 53 which serves to operate one or the other of two switches as the filters and shutter move to and from their "in" and "out" positions, as will be fully described hereinafter, for the purpose of controlling the proper sequencing of the printer.

Located in a canopy 54 situated between the negative gate 12 and the projection lens 13 are a plurality, at least three, photoreceptors in the form of photocells which measure the amount of light passing through the negative. One of these photoreceptors designated as $P_g$ is sensitive to only green light, another which is sensitive to only blue light is deisgnated $P_b$ while the third which is sensitive only to red light is designated $P_r$. As is sometimes customary in color printers there may be two or more photoreceptors connected together which are sensitive to the same color light in order to increase the sensitivity of the light integrator. In the wiring diagrams of FIGS. 2 and 2A only one of these photocells, i.e., $P_g$ the green sensitive one, is shown because the hookup of each cell with its timer and the printer circuit is the same and to illustrate all three would only complicate the drawings and enlarge the present disclosure to no avail. Accordingly, in the wiring diagram only the thyratron for each of the red and blue timing circuits is shown, it being pointed out that these thyratrons will be fired after a given time as determined by the amount of red and blue light received by the red and blue photocells, respectively, in exactly the same manner as the thyratron of the green timer, as will be fully described hereinafter.

The sequence or cycling control circuitry constituting the present invention will now be described with particular reference to FIGS. 2 and 2A in which it is schematically shown. The three position power switch S1 when in the "standby" position supplies power from a 117 v. A.C. source to the electronic assemblies and the D.C. power supplies but does not supply power to the control circuits. Moving the power switch S1 to its "operate" position provides power to all the necessary circuits for normal operation. For the remainder of this circuit description the designations K2 and W represent the two sides of the 117 v. supply line.

*Print Cycle for Making a Single Print*

Before starting a print cycle the "run-test-retime" switch S7 is moved to the "run" position and the "repeat-single" switch S8 is moved to the "single" position.

With a negative N in the open negative gate 12, a printing cycle is initiated by momentarily operating the foot switch S2. This completes a circuit from point K2 via line 60 to the N.O. contact of the "gate open" switch S3, thence via line 61 to the coil of relay RL4 and to W. Relay RL4 is thus energized completing a circuit from K2 via line 62 to the N.O. contact (2) on RL4, thence via line 63 to the printing lamp 10 to W, and also via lines 63 and 64 through the N.C. contact of "gate motor" switch S19 and line 65 to the gate motor $M_g$ to W. The gate motor $M_g$ and the printing lamp 10 are thus energized. The closing of relay RL4 also completes a circuit from K2, line 97, the N.C. contact (1) of RL6, lines 66' and 66, N.O. contact (1) of RL4, coil of relay RL4 to W. This circuit maintains relay RL4 in an energized condition after the foot switch S2 is released.

Upon energization of the gate motor $M_g$, as described above, the negative gate 12 begins to close. The closing time of the gate provides the necessary delay to insure that the printing lamp 10, which is also energized by the operation of relay RL4, is brought to the proper intensity level before the exposure is started. As the negative gate nears its closed position (one-half revolution of the motor) the "gate motor" switch S19 is operated by cam C19 on motor shaft 18 to de-energize the gate motor $M_g$. The gate then coasts to the closed position as determined by roller 27 engaging one of the recesses 26 in disk 25 carried by the motor shaft 18, see FIG. 1. When the negative gate reaches its closed position the cam C20 operates the "gate closed" switch S9 which completes a circuit from the +90 v. supply, the N.C. contact (1) of the "paper advance guard" switch S6, line 67, the N.O. contact of the "gate closed" switch S9, line 68, N.C. contact (1) of the "run-test-retime" switch S7, and lines 69 and 69', through the "cyan filter out" switch S11, line 70, through the "magenta filter out" switch S12, line 71, through the "yellow filter out" switch S13, line 72, to the coils of relays RL1 red, RL1 green and RL1 blue to the negative side of the 90 v. supply designated as (—). Relays RL1 red, RL1 green and RL1 blue are thereby energized and complete a series circuit from a +105 v. supply through their (1) contacts, line 73, and through the coil of relay RL3 to ground. Relay RL3 is thereby energized. It is believed that it will be understood from what has been said above that the cyan, magenta and yellow "filter out" switches S11, S12 and S13 are those which are operated and closed by the tails 53 on the respective filters when the filters are moved to their position out of the printing beam. Likewise the "filter in" switches S14, S15 and S16, to be later mentioned, are those operated by the color filters as they move into the printing beam. The same holds true for switches S17 and S18, to be described, which are operated by the dark shutter as it moves into and out of, respectively, the printing beam.

When relay RL3 operates it completes a circuit to maintain the RL1 relays in the energized position through the following circuit components: +90 v. supply, N.C. contact (1) of the "paper advance guard" switch S6, line 67, N.O. contact of "gate closed" switch S9, line 68, N.C. contact (1) of "run-test-retime" switch S7, line 69, N.O. contact (2) of relay RL3, line 75, line 72, coils of relays RL1 red, RL1 green, RL1 blue to the (—) side of the 90 v. supply. Energization of relay RL3 also breaks the circuit from +90 v., through the N.C. contact (1) of relay RL3, line 76, through the "dark shutter in" electromagnet $E_s$ to the (—) side of the 90 v. supply and completes a circuit from +90 v., the N.O. contact (1) of RL3, line 77, through the "dark shutter out" electromagnet $E_s$ to the (—) side of the 90 v. supply. The dark shutter S is thus moved out of the light beam and the exposure begins.

When the dark shutter reaches its "out" position the tail 53 thereon actuates and closes switch 17 which completes a circuit from +105 v. line 78, through the coils of each of the RL2 relays (red, blue and green) and through their respective thyratrons $V_r$, $V_b$ and $V_g$ to ground. The thyratrons $V_r$, $V_b$ and $V_g$ form a part of an integrating timing circuit of known form for timing out each of the red, green and blue exposures. Since each of the red, green and blue exposure integrators are alike, in order to simplify the disclosure I have shown and will describe only one thereof, that one being for timing the green exposure. Looking at the upper right-hand portion of the circuit shown in FIG. 2A it will be seen that the cathode of the green thyratron $V_g$ is connected to a +105 v. supply through an adjustable potentiometer 79 so that the firing point of the tube can be adjusted as desired. The grid of the thyratron is connected through a resistance 80 to the positive (+) side of a timing capacitor $C_g$ whose negative (—) side is connected through a manually operated switch $S_{cc}$, which is one of a plurality of such color correction switches which may be provided but only one of which is shown, to one or the other of control potentiometers $P_1$ or $P_2$ which can be selectively connected to a —300 v. supply by manual operation of exposure control switches $P_{S_1}$ or $P_{S_2}$ and whose selection may be based on the type of film (indoor or outdoor) being printed and/or the subject classification of the negative. The positive side of the timing capacitor $C_g$ is connected to the cathode of the green photocell $P_g$ whose anode is connected to a +150 v. supply. For shorting the timing capacitor $C_g$ to remove any charge remaining thereon from a previous exposure prior to the start of a new green exposure switch contact (2) of relay RL1 green is connected by lines 83 and 84 across the capacitor.

The operation of the green exposure integrator will now be described. When the green relay RL1 becomes de-energized at the end of a previous green exposure switch contact (2) thereof closes and short circuits the timing capacitor $C_g$ to remove any charge remaining thereon. When an exposure starts relay RL1 is energized and opens contact (2) thereof to unshort the capacitor $C_g$. The green photocell $P_g$ then starts to charge the capacitor positively at a rate determined by the amount of green light striking it. Just as soon as the positive charge on the capacitor $C_g$ equals the negative charge applied through one of the exposure control potentiometers selected by manual closure of one of exposure control switches $P_{S_1}$ or $P_{S_2}$ and/or the operation of one of the color correction switches $S_{cc}$ then the grid of thyratron $V_g$ is made sufficiently positive for the tube to fire and energize relay RL2 green to terminate the green exposure. The aimpoint of the green integrator determined by selective operation of one of the exposure control switches $P_{S_1}$ or $P_{S_2}$ can be modified by connecting one or the other of a group of different variable resistances $R_c$ in circuit with the potentiometers $P_1$ or $P_2$ by the selective operation of one of a plurality of switches $S_{cc}$, only one of which is shown, and which in this instance is a color correction switch, a plurality which might be provided for the purpose of correcting for abnormal color balance of a negative to be printed. Each of color correction switches $S_{cc}$ are mechanically connected to a color balance switch S10 as indicated by broken line 90 in FIG. 2A, so that when any one of the group of color correction switches (one group for each of the green, blue and red integrators) is closed to connect one of the variable resistances $R_c$ in circuit with the potentiometers $P_1$ or $P_2$ so is switch S10 closed. The color correction switches $S_{cc}$ are of the conventional type which can be cancelled by operation of a solenoid and thus closure of color balance switch S10 means that at the end of an exposure energization of color cancel solenoid $S_L$ cancels, or opens, any color correction switch which might have been selectively closed. The connection between the color cancel solenoid $S_L$ and the color correction switches $S_{cc}$ is indicated by dotted line 200 in FIG. 2A. In addition to adjusting the aimpoints for the respective color exposure integrators in accordance with the factors already mentioned, the aimpoint may also be modified by the addition of other resistances, not shown, based on the size to which the print is magnified relative to the negative size during the printing step, i.e., magnification factor.

If one of the exposure control switches $P_{S_1}$ or $P_{S_2}$ is not closed prior to the start of an exposure, the printer will become locked up by reason of the fact that momentary closure of gate moving switch S20 places +105 v. on the plate of the thyratron $V_g$ through lines 91 and 78 and the coil of green relay RL2, and since the negative side of the timing capacitor $C_g$ is connected directly to ground potential the same as the cathode of thyratron $V_g$ the tube will immediately fire and cause operation of relay RL2 green and the energization of the "in" electromagnet $E_m$ through the N.O. contact (1) of relay RL2 green and de-energization of "out" magnet $E_m$ by opening of N.C. contact (1) which will cause the magenta filter $F_m$ to move into the printing beam and thus open switch S12. Inasmuch as the three switches S12, S11 and S13 are connected in series and must all be closed to start an exposure, the opening of any one of these switches, indicating that one of the filters is in the printing beam, will lock up the printer. Two or more exposure control switches $P_{S_1}$ and $P_{S_2}$ can be provided for each color integrator and can be based on the type of film the negative was made on, the type of exposure originally given the negative, subject classification of the negative, etc. Likewise, there can be any number of color correction buttons for each color integrator, although only one is shown in connection with the green integrator, and different buttons for size compensation, etc.; the combination of all these serving to vary the printing aimpoint of the printer. While one of the exposure control switches $P_{S_1}$ or $P_{S_2}$ must be closed before the printer will operate, this is not true of the color correction switches $S_{cc}$ because with a negative of normal color balance no color correction would be necessary. Since any change in the printing aimpoint of the printer which will be made by adjustment of the exposure control switches $P_{S_1}$ or $P_{S_2}$ will effect each of the color integrators in the same manner and will have to be set thereinto, all of the corresponding exposure control switches $P_{S_1}$ and $P_{S_2}$ of each integrator can be mechanically connected together so that when a certain exposure control switch of one integrator is operated the corresponding exposure control switch of the other two color integrators will be likewise operated. Such an arrangement of the exposure control switches of each of the integrators will result in each of the blocking filters being immediately moved into the printing beam during the closing movement of the negative gate by reason of the firing of the three thyratrons $V_g$, $V_b$ and $V_r$ should it be detected by momentary closing of the gate moving switch S20 that these exposure control switches are improperly adjusted, i.e., the operator forgot to close the appropriate one thereof.

Accordingly, after the exposure has been started upon the dark shutter S reaching its "out" position the three photocells $P_r$, $P_b$ and $P_y$ start to measure the amount of each color in the negative transmitted beam. When the red exposure integrator (not shown but like the green integrator described) times out and fires red thyratron $V_r$, relay RL2 red will operate. This breaks the circuit to the "cyan filter out" electromagnet $E_c$ and makes a circuit to the "cyan filter in" electromagnet $E_c$ at contact (1) on relay RL2 red. The cyan (minus red) filter thus is moved into the printing beam terminating the red exposure.

Similarly, when the green and blue integrators (the blue integrator not shown but being like the described green integrator) fire the $V_g$ and $V_b$ thyratrons, the relays RL2 green and RL2 blue operate inserting the magenta (minus green) and the yellow (minus blue) filters $F_m$ and $F_y$, respectively, into the printing beam and thus terminating the green and blue exposures.

When all three filters are moved into the printing beam a circuit is completed from K2, N.O. contact (2) of the "run-test-retime" switch S7, line 92, "cyan filter in" switch S14, line 93, "magenta filter in" switch S15, line 94, "yellow filter in" switch S16, line 95, contact (3) on relay RL3, line 96, coil of relay RL6 to W. Relay RL6 is thus operated breaking the circuit to relay RL4, including lines 66 and 97, at the N.C. contact (1) of relay RL6. Relay RL4 is thus released de-energizing the printing lamp 10 at N.O. contact (2) on RL4 and the printing lamp goes out. When relay RL4 relaxes it completes a circuit from K2, line 62, N.C. contact (2) on relay RL4, line 98, N.O. contact of the "gate motor" switch S19, line 65 to the gate motor $M_g$ to W. The gate motor being thus energized, rotates another half revolution to open the negative gate 12. At this point the "gate motor" switch S19 is released by cam C19 breaking the circuit to the gate motor at the N.O. contact of the gate motor switch. The negative gate then coasts to a stop in the open position as determined by roller 27 on arm 28 engaging a recess 26 in the face of disk 25, which is diametrically opposed to a similar recess in the periphery of the disk to stop the gate in a closed position.

The operation of relay RL6 completes the following circuit: K2, line 97, N.O. contact (1) of relay RL6, line 100, contact (3) on the "run-test-retime" switch S7, line 101, the N.O. contact on the "paper drive" switch S4, "paper advance" solenoid 49 to W. The paper advance solenoid being thus energized lifts pawl 48 and a paper advance is initiated as described above.

Relay RL6 also completes a circuit through its N.O. contact (3) which connects line 67 to line 69 and thus bypasses the "gate closed" switch S9, and contact (1) on the "run-test-retime" switch S7. This insures that, even though the "gate closed" switch S9 has been released by the opening of the gate, the three RL1 relays (red, green and blue), and therefore relays RL3 and RL6, are held operated until the "paper advance guard" switch S6 opens, as will be described below.

As the paper starts to advance, the "paper advance guard" switch S6 opens breaking the circuit at contact (1) from +90 v., line 67, contact (3) of relay RL6, line 69, N.O. contact (2) of RL3, line 75 to the coils of relays RL1 (red, green and blue) to the negative side of the 90 v. supply. Relays RL1 (red, green and blue) are thus de-energized and break the circuit to relay RL3, which, in turn, de-energizes the "dark shutter out" electromagnet $E_s$ and energizes the "dark shutter in" solenoid $E_s$ at contact (1) on relay RL3 thereby moving the dark shutter into a light beam. Attention is called to the fact that until the dark shutter reaches its "in" position, as shown in FIG. 2, the three RL2 relays (red, green and blue) are maintained in an energized condition from a +105 v. supply through the N.C. contact of the "dark shutter in" switch S18, line 111, N.O. contact (2) on RL2 green, lines 112, 113 and 78, coils of relays RL2 blue, RL2 red, and RL2 green through the thyratrons to ground. This insures that the light beam is totally cut off by the cyan, magneta and yellow filters until the dark shutter reaches its "in" position to keep the light cut off the printing aperture 14 until the next exposure is desired. When the switch S18 is opened by the dark shutter reaching its "in" position, the circuit to the three relays RL2 (red, green and blue) is broken and the three filters are moved out of the light beam reclosing switches S11, S12 and S13, thus preparing the circuit for another exposure start as soon as the paper advance is complete.

When relay RL3 is de-energized it also breaks the circuit to RL6 at contact (3) on relay RL3. RL6 is thus de-energized breaking the circuit to the "paper advance" solenoid 49 at N.O. contact (1) on relay RL6. When the "paper advance" solenoid releases it allows the pawl 48 to drop to engage the ratchet 46 and set up a stop for a paper advance clutch when the paper advance cycle is complete. The next printing cycle can be initiated by again depressing the foot switch S2 at any time after the negative gate 12 has been reloaded. Should the next cycle be initiated before the previous paper advance is complete the new exposure is automatically delayed until the "paper advance guard" switch S6 closes indicating that the paper advance is complete.

*Print Cycle—Multiple Prints*

When more than one print of a given negative is desired, the addiitonal prints may be obtained by either of two methods:

(1) For a small number of reprints the foot switch S2 is merely held in an operated or closed condition. The exposure is made exactly as in the case of a single print as described above. When the first exposure is complete, however, relay RL4 is held in an energized condition through the following circuit: K2, N.O. contact of the foot switch S2, line 60, N.C. contact of "gate open" switch S3, line 120, line 66, N.O. contact (1) of relay RL4, coil of RL4 to W. With relay RL4 energized, the printing lamp 10 is kept energized and the negative gate is held closed. Thus, when the paper advance has been completed, as indicated by the reclosing of the "paper advance guard" switch S6, another exposure is initiated. The operator counts the print cycles by ear or by watching a print counter if one is used, and releases the foot switch during the last desired print cycle. At the end of that exposure relay RL4 is released and the cycle completed as in the case of a single print.

(2) For larger numbers of reprints the "repeat-single" switch S8 is moved to the repeat position. The print cycle is then initiated by momentarily depressing the foot switch S2 as usual and the first exposure is made in the normal manner. At the end of the first exposure, however, relay RL4 is held in the energized position by the following circuit: K2, "repeat" contact of the repeat-single switch S8, line 66, N.O. contact (1) on relay RL4, coil of relay RL4 to W. Thus additional prints from the same negative are made just as in the first method above described. The print cycles are counted by ear or by observing a print counter if one is used, and the "repeat-single" switch S8 is moved to the "single" position during the last desired print cycle. At the end of that exposure, relay RL4 is released and the remainder of the cycle is the same as for a single print with the gate opening and the printing lamp being extinguished.

The "manual paper advance" switch S5 is a push-button switch which, when momentarily depressed, will operate the paper advance mechanism. The circuit is completed as follows: K2, N.C. contact (2) on relay RL4, line 130, "manual paper advance" switch S5, line 101, paper drive switch S4, paper advance solenoid 49 to W. This manual advance is provided for purposes of threading up the paper feed of the printer without having to go through the complete exposure cycle for each paper advance. Accidental operation of the manual advance switch during an exposure is prevented by using the N.C. contact (2) on relay RL4 which is held open during the exposure cycle.

The function of the "color balance" switch S10 and the "color cancel" solenoid $S_L$ are as follows: When it is decided that a negative must be exposed under abnormal color balance conditions in order to produce a satisfactory print therefrom, the aimpoint of the appropriate one of the color integrators is altered by depressing one of the color correction switches associated with said color integrators, i.e., one of a plurality of switches like switch $S_{cc}$ shown in the green integrator described above. When any of the color correction switches are thus operated the "color balance" switch S10 is automatically closed by virtue of a mechanical connection between the switches, see dotted line 90 in the green integrator of FIG. 2A. However, at the end of the exposure in the case of a single print, or at the end of the last exposure in the case of multiple prints, when relay RL6 is operated and relay RL4 is released the following circuit is complete: K2, N.C. contact (2) on relay RL4, line 98, color balance switch S10, N.O. contact (2) on relay RL6, line 135, color cancel solenoid $S_L$ to W. The color cancel solenoid is thus energized and it operates to reopen the color correction switches $S_{cc}$ of the color integrators, by reason of the fact that the color correction switches are of the known type which can be released by the operation of a solenoid, and by virtue of the mechanical connection between the color correction switches and the color balance switch S10, switch S10 is reopened. The opening of the color balance switch S10 breaks the circuit to the "color cancel" solenoid $S_L$.

The "run-test-retime" switch S7 is provided for setup purposes in order to make it possible to repeat exposures without having to advance the paper. Its operation is as follows: The switch S7 is placed in the test position and the exposure initiated by the foot switch S2 as usual. When relay RL4 operates a circuit is completed from K2, N.C. contact (2) on the "run-test-retime" switch S7, line 66, N.O. contact (1) on relay RL4, coil of relay RL4 to W. This completed circuit keeps relay RL4 energized so that at the end of the exposure the printing lamp 10 is not turned off and the negative gate 12 is kept closed. In addition, the "paper advance" solenoid 49 circuit is opened at contact (3) on the "run-test-retime" switch S7 so that at the end of the exposure the paper is not advanced and the operation is suspended with the three blocking filters in the printing beam.

Momentarily moving the "run-test-retime" switch S7 to its "retime" position opens the circuit to the relays RL1 red, RL1 green and RL1 blue at contact (1) of switch S7 thus simulating the action of the "paper advance guard" switch S6. The dark shutter S moves into the printing beam and the filters move out of the beam as in normal operation. Releasing the "run-test-retime" switch S7 to its test position thus initiates another exposure. When the setup adjustments are complete the "run-test-retime" switch S7 is moved to the "run" position which allows the paper to advance and allows the gate to open.

The "gate moving" switch S20 is used to detect an improper setting of the exposure control circuitry as discussed above in describing the green integrator which is identical to the red and blue integrators not shown. The circuit functions as follows: During the closing action of the gate 12 the "gate moving" switch S20 is momentarily operated by cam C21 on the gate motor shaft 18 to complete the following circuit: +105 v., N.O. contact of switch S20, lines 91, 78 and 113, through each of the RL2 relays (red, green and blue) and their respective thyratrons $V_r$, $V_g$ and $V_b$ to ground. Whenever the improper exposure control setting mentioned above exists in any one of the different color integrators, i.e., if $P_{S_1}$ or $P_{S_2}$ of the green integrators is not closed, the three thyratrons will fire immediately to operate the three relays RL2 (red, green and blue) and causing the three blocking filters $F_c$, $F_m$ and $F_y$ to be moved into the printing beam. This condition is maintained by a circuit from +105 v., contact (2) of the "paper advance guard" switch S6, line 119, N.C. contact (6) on the "run-test-retime" switch S7, line 110, N.O. contact (2) on relay RL2 red, lines 78 and 113, through the three RL2 relay coils and their corresponding thyratrons $V_r$, $V_g$ and $V_b$ to ground. Therefore, when the gate 12 reaches the closed position the circuit to the RL1 relays (red, green and blue) is prevented from closing because of the open condition of the three "filter out" switches S11, S12 and S13. The printer remains in this locked up condition until the improper exposure control setting is corrected and the "run-test-retime" switch S7 is moved momentarily to the "test" position and returned to the "run" position. The printing cycle will then be carried out in the normal manner.

While I have shown and described certain specific embodiments of my invention, I am aware that many modifications thereof are possible. My invention, therefore, is not to be limited to the specific structural details shown and described, but is intended to cover all modifications coming within the scope of the appended claims.

Having thus disclosed by invention, what I claim as new and novel and desire to secure by Letters Patent of the United States is:

1. In a color printer for making color prints from color transparencies the combination of a negative gate movable between an open position, in which a transparency can be inserted into or removed therefrom, and a closed position, in which it holds a transparency to be printed in a flat condition; means for driving said gate between said two positions; means for illuminating a transparency in said gate with light containing the three primary colors and including a printing lamp; means for projecting an image of a transparency held by said gate onto an exposure aperture located in a printing plane; means for intermittently advancing given lengths of a strip of color sensitive printing paper across said printing plane and into and from said superposed relation with said exposure aperture; integrator means for individually integrating and measuring the amount of each of the primary colors in the transparency transmitted printing beam and adapted to produce an output signal when a given amount of each primary color has passed through said transparency; three subtractive primary filters mounted to move individually into and out of said printing beam to stop and permit, respectively, the green, red and blue exposure of said printing material; electromagnetic means for selectively moving each of said filters into and out of said printing beam; a dark shutter movable into and out of said printing beam; electromagnetic means for selectively moving said shutter between its two positions; means, including a start switch, for starting said gate driving means to close said gate and turning on said printing lamp substantially simultaneously; means for stopping said gate driving means when said gate reaches its closed position; means responsive to said gate reaching its closed position for energizing said electromagnetic means for moving said dark shutter out of said printing beam to start the exposure and starting integration of the negative transmitted beam by said integrator means; means responsive to each of said integrator means receiving a predetermined amount of the primary color to which it is sensitive for operating said electromagnetic drive means for the corresponding one of the subtractive filters to move said filter into the printing beam and stop the exposure for the corresponding primary color; means responsive to all three filters moving into said printing beam to start the paper advance to move the exposed area out of, and a new area of paper into, superposed relation with said exposure aperture, to turn off the printing lamp, restart the gate driving means to drive the gate to an open position, and to operate said electromagnetic drive means for the dark shutter to move the dark shutter back into the printing beam; means responsive to said dark shutter reaching its position in the printing beam for operating said electromagnetic drive means for said filters to move each of the filters out of said printing beam; means for stopping said gate in an open position; and means responsive to said gate reaching said open position to condition the printer for another exposure cycle when the start switch is again closed.

2. A color printer according to claim 1 characterized by the inclusion of means responsive to said paper drive means for delaying a second exposure until said paper has been advanced even though the start switch is again closed prior to the paper being advanced.

3. A color printer according to claim 1 including means for making a multiple number of prints from one negative, and including means responsive to said paper drive means for recycling the start of an exposure upon the completion of a paper advance while maintaining the negative gate closed and the printing lamp illuminated.

4. A color printer according to claim 1 provided with means for adjusting the aim point of each of said integrator means in accordance with abnormal color balance conditions in the negative and including a plurality of color correction switches which may be selectively manually operated, and means responsive to the completion of the exposure of a given transparency for automatically cancelling and resetting said operated color correction switches.

5. A color printer according to claim 1 in which one of said integrator means is provided with means for adjusting the aim point of each integrator in accordance with certain characteristics of the transparency to be printed and including at least two manually operated switches one of which must be operated to make an exposure; and means for automatically detecting and indicating to the operator prior to the making of an exposure that one of said switches is not operated.

6. A color printer according to claim 5 in which said last mentioned means is responsive to the closing movement of said gate and automatically stops the printer to indicate that one of said switches is not operated.

7. A color printer according to claim 5 in which said last mentioned means is responsive to the closing movement of said gate and causes said three filters to move into the printing beam prior to the time the gate reaches its closed position and thereby lock up the printer against further operation until the detected improper setting of said switches is remedied.

References Cited in the file of this patent

UNITED STATES PATENTS

| 2,227,987 | Tuttle et al. | Jan. 7, 1941 |
| 2,507,161 | Hughey | May 9, 1950 |

FOREIGN PATENTS

| 817,277 | Great Britain | July 29, 1959 |

UNITED STATES PATENT OFFICE
CERTIFICATE OF CORRECTION

Patent No. 3,062,096            November 6, 1962

Thomas B. Brown

It is hereby certified that error appears in the above numbered patent requiring correction and that the said Letters Patent should read as corrected below.

Column 10, line 68, strike out "said", first occurrence.

Signed and sealed this 7th day of May 1963.

(SEAL)
Attest:

ERNEST W. SWIDER
Attesting Officer

DAVID L. LADD
Commissioner of Patents